United States Patent

Thompson et al.

[11] 3,976,527
[45] Aug. 24, 1976

[54] METHOD OF EXTRUDING THERMOPLASTIC FILMS

[75] Inventors: Kenneth Thompson, Waynesville, N.C.; Richard C. Ihde, Parma Heights, Ohio

[73] Assignee: U.S. Plywood-Champion Papers Inc., Hamilton, Ohio

[22] Filed: Sept. 13, 1972

[21] Appl. No.: 288,773

Related U.S. Application Data

[60] Continuation of Ser. No. 856,360, Sept. 9, 1969, abandoned, which is a division of Ser. No. 530,119, Feb. 25, 1966, Pat. No. 3,482,278.

[52] U.S. Cl. .............................. 156/244; 156/500; 229/3.1; 427/256; 427/288
[51] Int. Cl.² ..................... B29B 5/00; B29F 3/06
[58] Field of Search ............ 156/244, 500; 229/3.1; 117/44, 45; 425/111, 113, 325, 376, 377, 378 R, 381, 385, 461, 465, 466; 427/256, 286, 288

[56] References Cited

UNITED STATES PATENTS

| 2,514,211 | 7/1950 | Carlson | 425/190 |
| 3,305,383 | 2/1967 | Gordy | 117/44 X |

Primary Examiner—Caleb Weston
Attorney, Agent, or Firm—Wood, Herron & Evans

[57] ABSTRACT

A composite article suitable for forming liquid-containing paperboard cartons is made by laminating an extruded thermoplastic film to an elongated paperboard web. The film has thick and thin strips and the thick strips are laminated to the web over areas thereof which are to ultimately form the bottom portions of the cartons. Thermoplastic material is regulated within an extruder and after extrusion the film takes on a profile imparted by the regulation of the material within the extruder die.

33 Claims, 17 Drawing Figures

INVENTORS
Kenneth Thompson
Richard P. Ihde
BY
Wood, Herron & Evans
ATTORNEYS

METHOD OF EXTRUDING THERMOPLASTIC FILMS

This is a continuation of application Ser. No. 856.360, filed Sept. 9, 1969, now abandoned, which is a divisional of application Ser. No. 530,119, filed Feb. 25, 1966, and now U.S. Pat. No. 3,482,278.

This invention relates to the extrusion of plastic film and particularly to the extrusion of plastic to provide a film having a profiled cross section, that is, a cross section in which certain preselected portions are thicker than other portions. The invention also relates to the manufacture of articles using the profile film of the present invention.

The invention will be described in particular relation to paperboard milk cartons of the type described in U.S. Pat. No. 3,120,335 but it will be apparent that the invention has application to other manufactures.

In general, the milk carton on which the invention is employed is paperboard coated on both sides with a thermoplastic material such as polyethylene which is extruded onto the board as the board passes in the form of a web adjacent the extruder. THe coated board is normally printed, scored, cut into blanks, sealed along one edge to form a tube, and sealed at its bottom and top ends. Probably the most critical portion of the milk carton is its bottom structure including all bottom scores and corners, for it is this portion of the milk carton which most frequently develops leaks which render the carton unsuitable for the end use.

There are several reasons for the leaks in the bottom portion of the carton and at least two of these are related to the thickness of the plastic which covers the bottom structure. First, pinhole leaks in the bottom structure develop during heat sealing when the plastic coating on the paperboard is raised above that temperature at which it will fuse to the extent necessary to effect the sealing of adjacent bottom forming panels to each other. The pinholes permit the liquid contents of the carton to penetrate the coating to the paperboard and to flow throughout at least the lower portion of the paperboard. While the liquid contents might not leak through the outer plastic film, the soaking of the paperboard causes the carton to lose its rigidity, giving it the unpleasant feel of a soggy bag rendering it unsuitable for the use intended.

Second, the carton is subjected, during normal handling, to repeated stressing due to the hydraulic movement of the liquid within the carton, the stressing causing the flexing of the side walls, the stress being localized at the bottom area of the carton.

It is desired to minimize the leaking of paperboard cartons caused by pinholes and bottom failures of the type described above by increasing the thickness of the thermoplastic coating on the bottom portion of the carton. It is, of course, possible to attain the objective of minimizing leaks by markedly increasing the thickness of the film all over the carton but such as increased thickness of film in areas where it is not needed would be uneconomical.

Therefore, it has been an objective of the invention to provide a method for extruding a plastic film in which the film has preselected areas of varying thickness. More particularly, it has been an objective of the invention to extrude a plastic film onto a paperboard web which is to be scored and converted into milk cartons, the film on at least one side of the web having a greater thickness overlying the area to be scored to form the major horizontal bottom score line.

It has been another objective of the invention to provide, as an article of commerce, a paperboard web coated on at least one side with a thermoplastic film which includes a longitudinally extending strip which is thicker than the remainder of the film.

These and other objectives of the invention will become more readily apparent from the following detailed description taken in conjunction with the following drawings in which.

Figure 1:
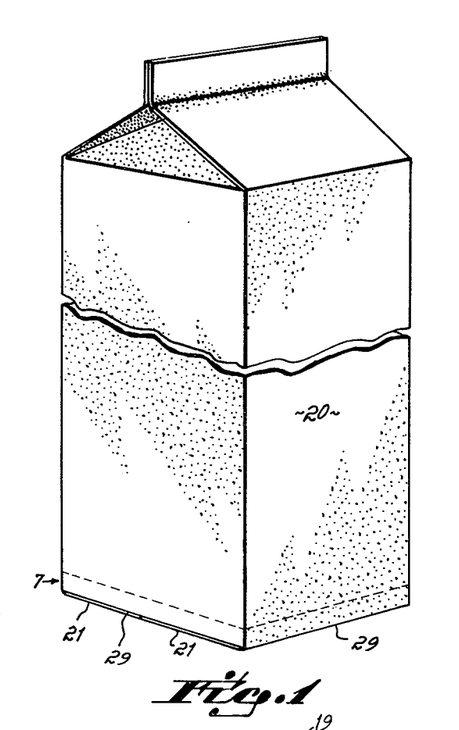
FIG. 1 is a perspective view of a milk carton employing the invention.

The milk carton shown at 20 in FIG. 1 is formed of paperboard and is coated with polyethylene, both inside and out. The carton details are fully disclosed in U.S. Pat. No. 3,120,335. As illustrated in FIG. 1 and shown in more detail in the patent referred to above, the carton bottom structure is formed by folding panels 21 transversely across the bottom of the carton, the panels being folded on score lines 29. The bottom structure is completed by applying heat and pressure to the panels which are folded upon one another. The polyethylene which has been applied to the paperboard fuses during the application of heat and pressure to form a sealed bottom structure.

After the carton bottom structure has been formed, the carton is filled with milk or other liquid and then the top seal is formed. In the handling of the carton after the forming and filling until it reaches the place of the ultimate user, the carton is subjected to stresses caused by bouncing, vibrating, and the like which causes the contents to force the side walls to flex. The effect of this stress is most pronounced at the location of the fold lines 29 and it is in this area that the greatest occurrence of leaks is found.

The objective of the present invention has been to provide an increased thickness of polyethylene on at least one surface of the carton, preferably the inside surface, which will cover the score line 29 and increase the resistance of that area to that fracture which will cause leaking, that is failure, of the container. It would, of course, be possible to increase the thickness of the polyethylene film at the score line simply by increasing the thickness of the polyethylene film uniformly all over the surface of the carton. However, such an increase would markedly increase the cost of manufacture of the carton and is, therefore, unsuitable.

Figure 2:
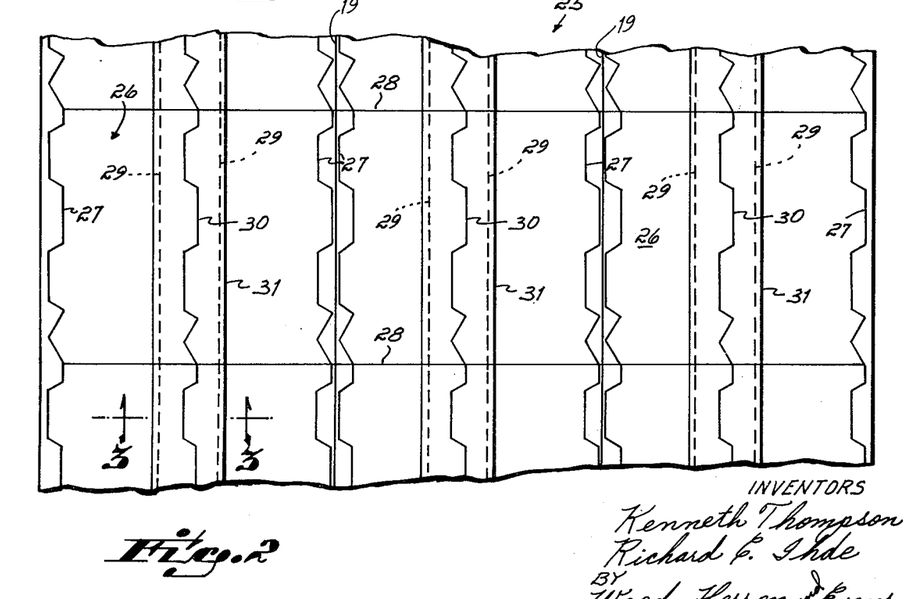
FIG. 2 is a plan view of a web to which the coating of the present invention has been applied.
Figure 3:
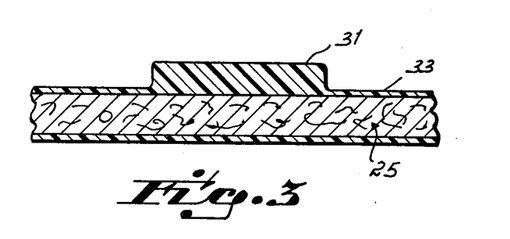
FIG. 3 is a cross sectional view taken along lines 3-3 of FIG. 2.

The manner in which the plastic coating is increased in the area of the score line is illustrated in part in FIG. 2 which is a plan view of a fragment of the web which is coated with the plastic. The web indicated at 25 is, in the exemplary embodiment, wide enough to space six carton blanks 26 across its width. After being coated the web will be slit along line 19 and rewound into three rolls. Thereafter the carton blanks will be cut, scored, formed into cartons and filled.

The remaining lines shown on the web 25 are merely to illustrate where the longitudinal top forming cut lines 27, the transverse cut lines 28, major horizontal score lines 29 for the bottom structure, and the bottom forming cut lines 30 occur. As shown, the pattern of each blank 26 is such that transversely adjacent blanks nest with each other along their bottom forming cut lines 30. This nesting spaces the major horizontal score lines 29 to be formed in respective carton blanks approximately five inches from each other. Thus, it is possible to apply an extra thickness of plastic film to the score line areas 29 by applying a thicker film of plastic on a longitudinal strip 31 which is approximately six inches wide, the area of the thicker plastic extending approximately ½ inch beyond the score lines 29.

By way of example, the paperboard substrate 25 is 0.022 inch thick and weighs 285 pounds per 3,000 sq. ft. ream (500 sheets at 24 × 36 inches). The profile coating in the thin area indicated at 33 is 0.00075 inch thick and in the thicker area indicated at 31 is 0.0015 inch thick. It is to be understood that all of the dimensions set forth throughout this application are merely examples of one form of the invention and are subject to considerable variation depending on the particular application to which the invention is put.

Figure 4:
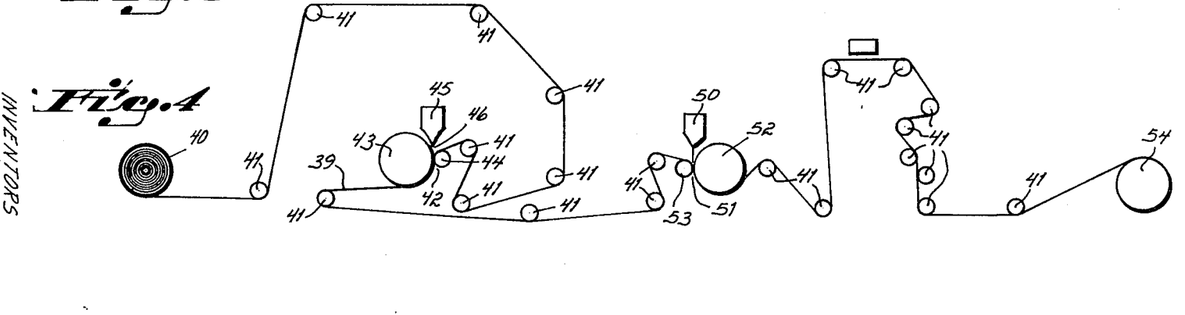
FIG. 4 is a diagrammatic side elevational view illustrating the layout with which the extruder of the present invention is used.
Figure 5:
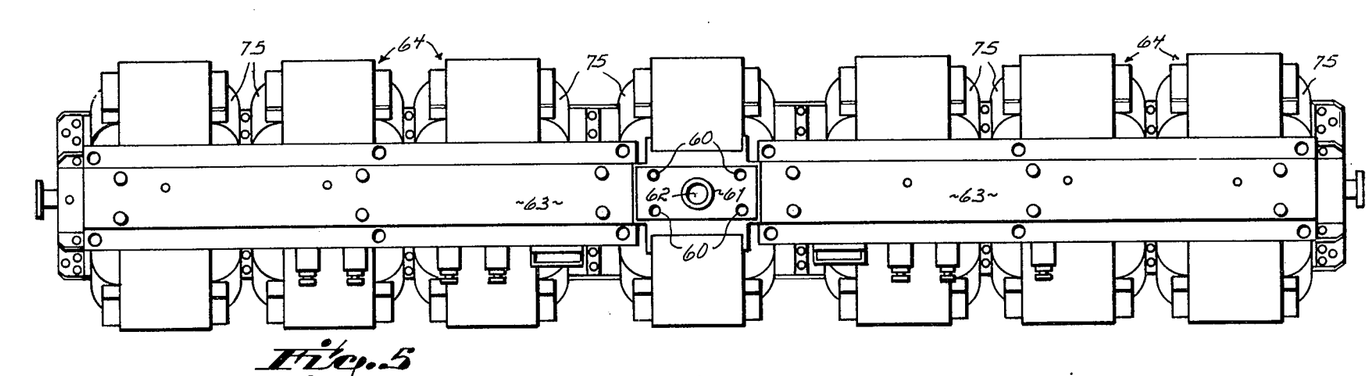
FIG. 5 is a top plan view of the extruder die assembly.
Figure 6:
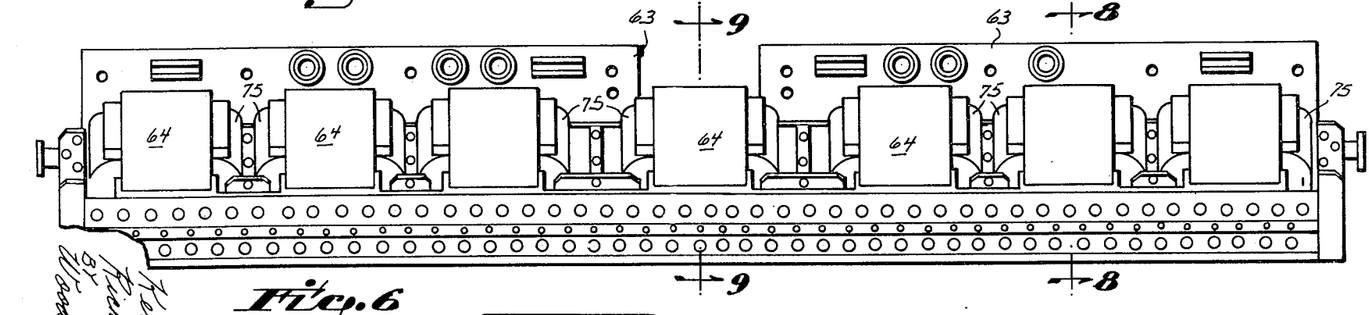
FIG. 6 is a side elevational view of the die assembly.
Figure 7:
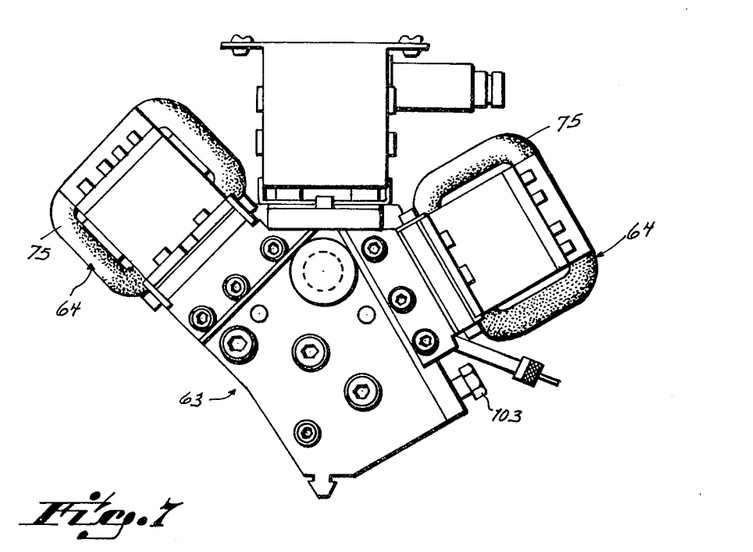
FIG. 7 is an end elevational view of the die assembly.

The profile coating is applied in an extruder line as illustrated in FIG. 4. There, a supply roll 40 of paperboard stock is fed as a web over idler rolls 41 into a nip 42 formed between a chrome chill roll 43 and a rubber pressure roll 44, both of which are water cooled. Immediately above the nip is an extruder 45 to be described in greater detail below which continuously feeds an extruded hot plastic film 46 into the nip 42. The outlet of the extruder 45 is preferably positioned in relation to the nip so the film 46 first engages the web and thereafter is pulled by the web into the nip where it is chilled by its engagement with the chill roll. The lineal speed of the web is approximately twenty times faster than the feeding rate of the extruded film. Consequently, the film is stretched to approximately one twentieth its thickness between the time it is extruded and the time it engages the web.

The coated web 39, after it leaves the nip, passes over additional web handling idler rolls 41 to reverse the position of its surfaces so that the coated surface faces down and the uncoated surface is upwardly facing to receive the second coating. The second coating is applied by the extruder 50 as the web passes through the nip 51 formed between a chill roll 52 and a pressure roll 53.

After passing through the nip 51, the web passes over additional idler rolls 41 and is wound on a reel 54. Between the nip 51 and the reel 54, the surface of the web may be subjected to treatment as by a corona discharge, for example, which conditions the polyethylene surface to make it more receptive to printing.

It is common practice thereafter to slit the web and rewind it into separate rolls which are shipped to the converter. At the converter, the web is printed, scored, and cut into separate blanks, the blanks receiving a side seam. In this condition, the blanks are shipped to the dairy where the bottom structure is formed, the carton is filled, and the top structure is formed.

EXTRUDER DIE ASSEMBLY

The extruder die assembly receives molten plastic web as polyethylene which has a temperature of approximately 600° F. and a pressure of 300 p.s.i. The plastic is brought to the die assembly in that condition by the extruder structure which is shown, for example, in U.S. Pat. No. 2,944,286, the details of which do not form any part of the present invention. The extruder receives the plastic in the form of pellets and drives the pellets by means of a screw to the die assembly through a metering valve. The screw feeds the plastic at a rate greater than the metering valve will pass. As a consequence, the plastic not only flows toward the metering valve but reverses its flow where it is sheared between the screw thread and the housing in which the screw thread is located. This pressure and shearing action causes the plastic to reach approximately the temperature at which it is to be introduced into the die assembly. Preferably, the screw has additional heaters mounted around its housing to add additional heat as required.

The die assembly to which the molten plastic is fed is illustrated in FIGS. 5 to 12. The die assembly is supported by four bolts 60 on an adapter manifold 61 which includes an inlet pipe 62 through which the molten plastic is fed into the die assembly. The die assembly includes an elongated die body 63 on which induction heaters 64 are mounted, a fixed die lip 65 which is secured to the body by a wedging block 66, and a series of bolts 67 and an adjustable die lip 70 which is fixed to the die body 63 by clamping bolts 71.

Figure 8:
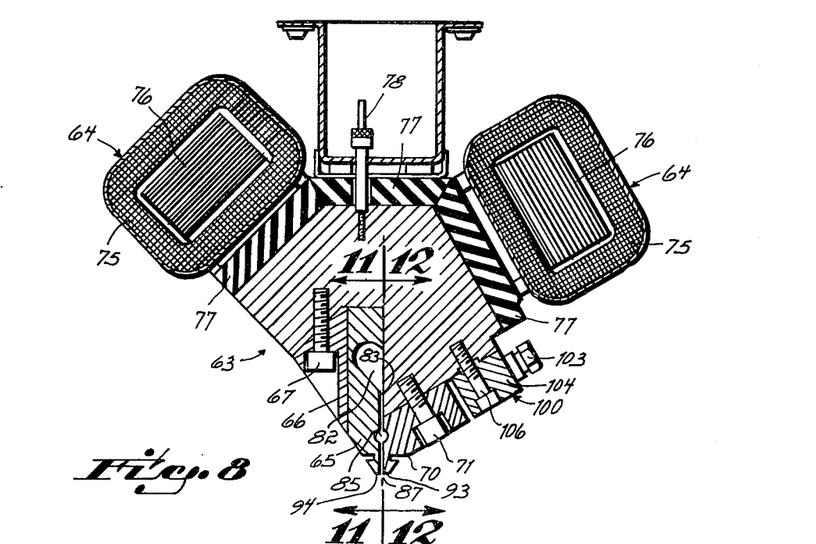
FIG. 8 is a cross sectional view taken along lines 8—8 of FIG. 6.
Figure 9:
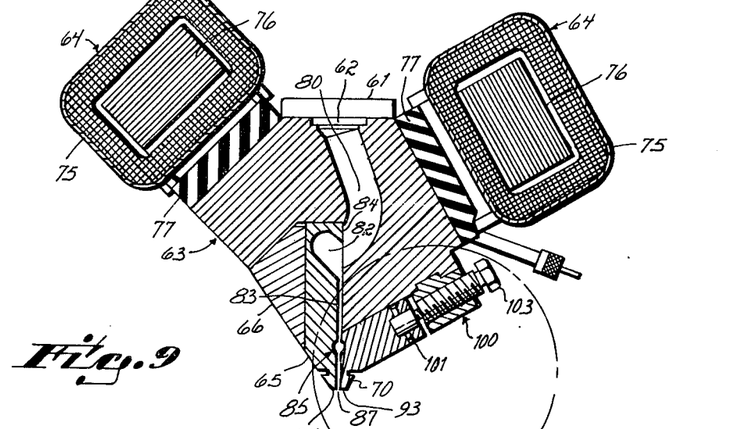
FIG. 9 is a cross sectional view taken along lines 9—9 of FIG. 6.

Each heater 64 includes a winding 75 wound about an iron core 76 which is U-shaped and has its ends passing through the insulation 77 mounted across the upper surfaces of the die body 63. Thus, the die body completes the magnetic circuit with which each coil is associated and the energizing of the windings with alternating current causes flux to pass through the die body 63, the hysteresis loss in the body causing the body to heat to the desired temperature. As shown in FIG. 8, a thermocouple 78 projects into the die body 63 to detect its temperature.

The die body has an entrance channel 80 (FIGS. 9 and 12) through which the molten plastic passes from inlet pipe 62 into the die body. The outlet of the channel 80 is adjacent an apex 81 of a V-shaped distribution manifold 82 in the surface of the fixed die lip 65. The fixed die lip 65 has a surface 83 below the distribution channel or manifold which is recessed approximately 0.020 inch from the surface 84 above the distribution manifold. That recess spaces the surface 83 away from the opposed surface of the die body and permits molten plastic to flow between the fixed die lip and the die body.

Below the distribution manifold 82 are grooves 85 and 86 on the fixed and adjustable die lips respectively, the grooves together forming a recovery channel in which the resin collects at equal pressure all across the die. The recovery channel is spaced a uniform distance from the die exit 87. Below the recovery channel, the facing surfaces 88 and 89 of the die lips are planar, with the exceptions described below, and are spaced apart approximately 0.020 inch. With all conditions being equal, the plastic should flow from the recovery channel out of the exit at a uniform rate all across the exit 87.

In accordance with the present invention, the adjustable die 70 has three recesses 90, 91, and 92 in its surface 89 extending from the recovery channel to the exit edge 93 of the die lip. The centerlines of the lateral recesses are offset slightly (one-fourth inch in the described embodiment) toward the ends of the die in relation to the centerline of the strip 31 applied to the web. The recesses do not project into the exit edge 93 and that edge is therefore spaced uniformly away from the opposed edge 94 of the fixed die lip throughout the length of the extruder die. It should be understood that greater or fewer than three recesses could be employed and that the recesses could be formed in the fixed die lip or both die lips could be recessed without departing from the invention or altering its operation. The particular shape of the recesses is important and will be discussed in detail below.

Figure 10:
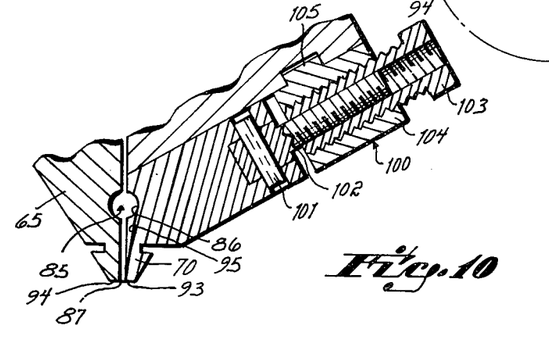
FIG. 10 is a fragmentary enlarged view of the encircled portion of FIG. 9.
Figure 11:
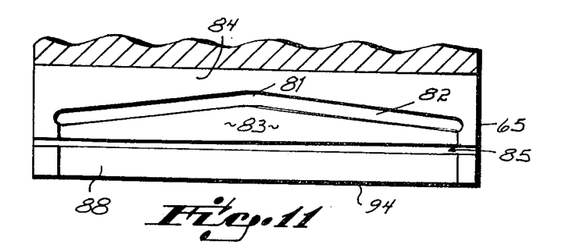
FIG. 11 is a cross sectional view taken along lines 11—11 of FIG. 8.
Figure 12:
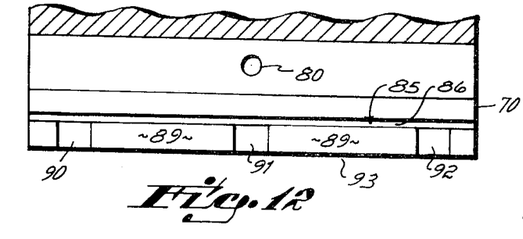
FIG. 12 is a cross sectional view taken along lines 12—12 of FIG. 8.

The adjustable die lip 70 is mounted to the die body 63 by a bolt 71 as indicated above. The bolt 71 has a loose fit with respect to the adjustable die lip, thereby permitting transverse movement of the die lip with respect to the axis of the bolt. As best illustrated in FIG. 10, the adjustable die lip is connected to a micrometer adjusting screw assembly 100 by a lock pin 101 passing through the die lip 70 and an inside bolt 102. The inside bolt is threaded to the inside of an outside bolt 103, the outside bolt being threaded to a stationary block 104 which is keyed to the die body at 105 and bolted to the die body by a bolt 106 as shown in FIG. 8. The connection of the micrometer adjusting screw assembly to the adjustable die lip coupled with the loose connection of the die lip to the clamping bolt 71 permits the spacing of the die lip with respect to the fixed die lip 65 to be varied within the limits required in the operation of the extruder.

Figure 13:
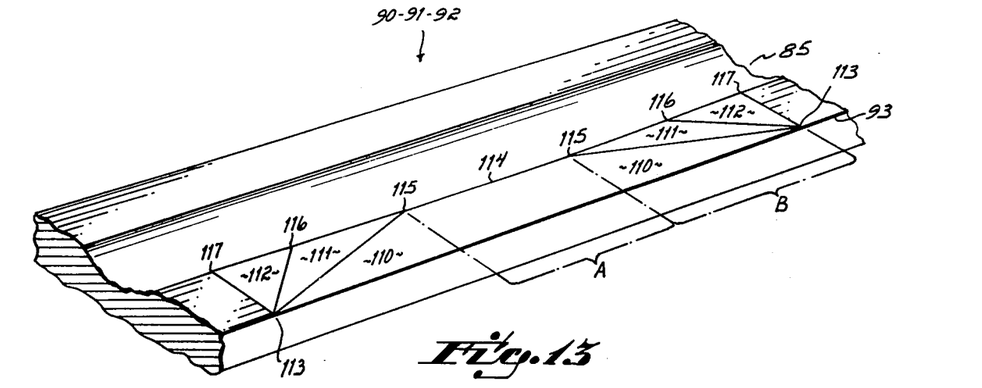
FIG. 13 is a fragmentary perspective view of the operative face of the adjustable die lip.

Referring to FIG. 13, the shape of the recesses 90, 91 and 92 is illustrated. The full length of the recess in the example illustrated is approximately seven inches. Its length will, of course, depend upon the width of the profiled strip to be deposited or extruded onto the web. Over approximately two inches at the center of the recess, the recess has a surface 95 which is tapered back from the edge 93 uniformly to a depth of 0.009 inch. That portion is designated as A, and in transverse section the recess is in the shape of a triangle (FIG. 10).

Each recessed corner designated as B is formed by three triangular surfaces 110, 111, and 112, all having a common apex on the die edge at the corner 113 of the recess. At the rearward edge 114 of the recess, the point 115 on triangle 110 is at the same level as the rearward edge of the central portion A. Triangles 111 and 112 have a common point 116 on rearward edge 114 which is elevated about one-third of the maximum depth of the recess, that is, the depth of the drop from the die edge 93 to the rearward edge 114. The triangle 112 has a third point 117 which is at the same level as the die edge 93. The central portion A and the two corner portions B thus provide a recess above the die edge 93, the recess, in longitudinal section, being flat in the center and at its ends or corners sloping gently up to the level of the die edge 93.

Figure 14:
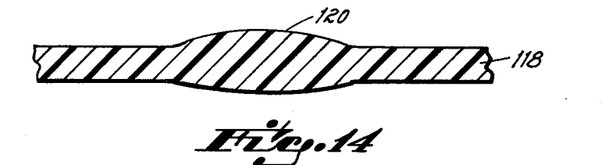
FIG. 14 is an enlarged diagrammatic cross sectional view of profiled plastic coating from the extrusion die.

The recess above the exit of the die causes the molten plastic to be extruded and then assume the shape found in cross section in FIG. 14. There, it can be seen that immediately upon issuing from the die the strip indicated at 120 is a smoothly curving bead having a substantially greater thickness through its center than the approximately .020 inch thickness of the film as indicated at 118 and which extends over the remaining portion of the die exit.

Figure 15:
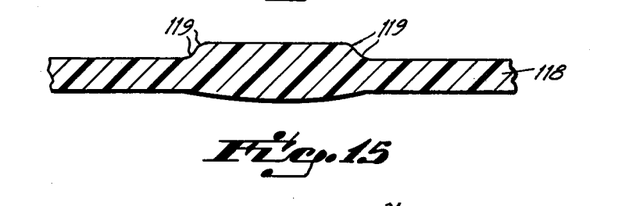
FIG. 15 is an enlarged diagrammatic cross sectional view of the profiled plastic just before it adheres to the paperboard web.
Figures 16, 17:
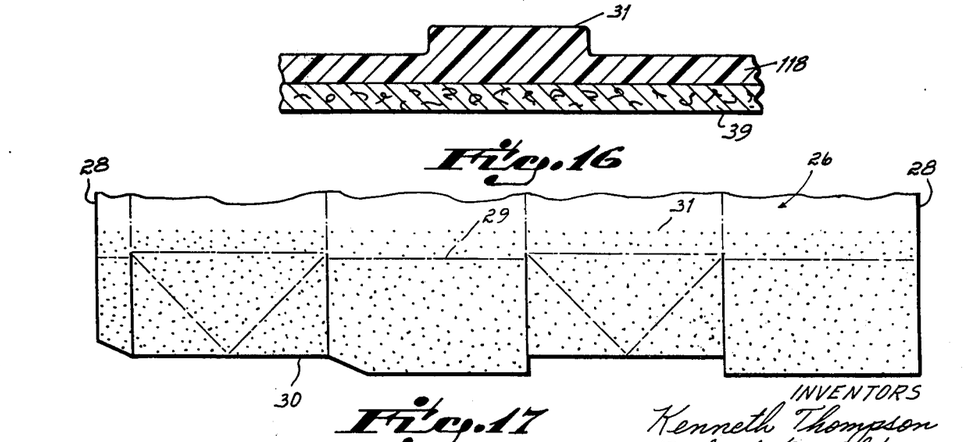
FIG. 16 is an enlarged diagrammatic cross sectional view of the profiled plastic and paperboard laminate.
FIG. 17 is a fragmentary plan view of a carton blank which has been coated, cut and scored.

Immediately upon issuing from the die, the surface tension or internal stresses of the film causes the film to bunch or gather at the corners as indicated at 119 and thus, the thickened strip attains a generally rectangular configuration. After being applied to the surface of the web 39 and passing through the nip, the laminate has the configuration illustrated in FIG. 16 with the thickened portion of the plastic overlying that area of the web which will be cut and provided with the major horizontal score lines by the converter.

As indicated above, the lineal speed of the web is much faster than the lineal rate of extrusion through the die exit (in excess of twenty times faster in the embodiment described) and as a consequence the film will be reduced in thickness by a factor of greater than twenty in the interval between its exit from the die and its deposit on the web. The illustration in FIGS. 14, 15, and 16 do not reflect this change in thickness and are for illustrative purposes only.

OPERATION

In operation, a roll of paper is received from a paper manufacturer, the roll being approximately seventy-six inches wide. The roll indicated at 40 in FIG. 4 is mounted on a stand at the upstream end of the extruder line and is passed over the idler rolls 41 and through the respective nips 52 and 51 as described above and is wrapped about a reel indicated at 54 in FIG. 4.

Pellets of the plastic are fed into the hopper and are driven by a screw toward the entrance channel 80 of the die. The particular thermoplastic material to be extruded may be any one of a number of different polymeric materials which are capable of being extruded as a film, these including polyethylene, polypropylene, nylon, and the vinyls. In the embodiment described, a medium density polyethylene is employed which has a specific gravity of 0.930 and a melt index of 2.5.

The screw acting on the polyethylene pellets causes them to fuse and form a molten viscous fluid which is forced at approximately 300 p.s.i. and a temperature of 600°F. into the entrance channel 80. The molten plastic flows first through the distribution manifold, thereby providing a supply of plastic under uniform pressure extending all along the length of the die. The plastic then is forced through the space between the die body 63 and the fixed die 65 until it flows into the recovery channel 86 at a fairly uniform rate. The plastic then flows into the recesses 90, 91, and 92 as well as through the remaining space between the fixed and movable dies and then passes through the die exit 87 as a molten film. In passing through the recesses, the triangular shape of the recess provides a reduced pressure drop between the recovery channel 86 and the die exit 87 and hence a larger volume of plastic issues from the exit adjacent the recesses than from the remaining areas. The ratio of volume from the recessed areas to the volume from the remaining areas stays substantially constant over a wide range of extrusion rates.

As in clearly evident from the description herein and from the drawings, the thermoplastic material is passed through the extruder die, and is regulated within the extruder die, prior to exiting through the die exit 87, so as to cause the material, upon exiting the uniform die exit 87, to take on, or to obtain, or to regain, or in the broad sense of remembering, to retain, a profile of significantly varying thickness. The material can then be laminated as a profiled film, having predetermined zones of varying thickness, to the moving web. In a preferred embodiment, the thermoplastic material is regulated such that it assumes a profile of varying thickness within the extruder die, i.e., in that area between the recovery channel 85–86, and the die exit 87. The material is then flattened out at, and extruded through, the die exit 87, and thereafter assumes a profile caused by regulation of the material within the die. Thicker zones of the extruded film are then laminated to the moving web in the manner described herein.

As stated above, the lateral profiling recesses 90 and 92 have their centerlines offset a slight distance from the centerline of the profile as it is to be deposited on the web. This offset permits the surface tension effects of the total film to draw the thickened plastic toward the center of the film so that when it reaches the paperboard web 39, the lateral strips of thicker plastic are at the proper relationship to the web. The distance of the offset will normally be determined empirically and will be dependent upon such factors as the characteristics of the plastic, its temperature, the distance of the die exit from the nip, and the like.

In the initial run, fine adjustments along the length of the die opening can be made through the manipulation of the micrometer adjusting screw assembly 100 in order to attain the desired thicknesses of the film across the width of the paperboard web. In the embodiment described, the exit opening of the die is maintained as uniform as possible along the length of the die at 0.020 inch. Since the lineal speed of the web is in excess of twenty times faster than the film is extruded, the 0.020 inch film will be stretched down to approximately 0.00075 inch across the areas surrounding the thicker profiled strips.

After the laminate has been wound on the reel as at 54, it is slit and trimmed into three rolls of approximately twenty-five inches width and shipped to the converter. At the converter, the web will be printed and scored, the scoring including two major horizontal score lines 29 extending along each side of the profiled portions 31 of the film as indicated in FIG. 2. Following scoring, the web is cut into blanks and the converter normally applies a manufacturer's side seam. Thereafter, the blanks are shipped to the dairy where they are formed as cartons with the bottoms sealed, filled, and sealed at the top.

While the invention has been described with particular reference to the manufacture of a polyethylene coated milk carton, it should be readily understood that the invention is not only applicable to the coating of other substrates, but also to the manufacture of unsupported films where specific areas of the film are desired to be thicker than other areas. For example, in the manufacture of unsupported plastic bags, it would be possible through the use of the present invention to manufacture a bag in which the area of the gusset crease is formed of thicker plastic than the remaining portions of the bag.

In the manufacture of unsupported films the invention is suitable for use with known processes for making unsupported films. These include extruding from an elongated linear die onto a chill drum or extruding from a circular die for blown film extrusion, the circular die having a die opening whose circumference is large compared to the width of the die opening and hence the die may be considered elongated.

We claim:

1. In the method of forming paperboard cartons whose bottom structure is formed by folding bottom panels about a major horizontal bottom score line, the steps comprising:

extruding a film of a unitary profiled thermoplastic polymer onto a paperboard web, said film having a thick strip overlying an area of the web in which said score line is to be formed, said thick strip being of such a thickness to withstand scoring, forming, sealing and other stresses in the area of said score line, which stresses are in excess of those to which other areas of the carton are exposed, and said thick strip being of greater thickness than adjacent portions of said film; and thereafter scoring and cutting said web to form individual carton blanks, said scoring including forming said major horizontal score line within the area of the web covered by said thick strip of film.

2. Process for laminating a moving substrate with a unitary thermoplastic film having predetermined zones of different film thickness, which comprises:

a. passing a thermoplastic material through die extruding means;

b. selectively regulating the thickness of the thermoplastic material across its width and in a direction parallel to the edges of the film prior to exiting from the die extruding means so as to impart to it a profile of varying thickness;

c. extruding said thermoplastic film which retains, upon exiting the die, the profile of varying thickness imparted to it in the die;

d. laminating said film to the moving substrate.

3. Process for laminating a moving substrate with a unitary thermoplastic film having predetermined zones of different film thickness, which comprises:

a. passing a thermoplastic material through the die extruding means;

b. selectively regulating the thickness of the thermoplastic material across its width and in a direction parallel to its edges, prior to exiting from the die extruding means, so as to impart to it a profile of varying thicknesses;

c. extruding said thermoplastic film which regains the profile of varying thickness imparted to it by the die; and d. laminating said film to the moving substrate.

4. Process for laminating a moving substrate with a unitary thermoplastic film having predetermined zones of different film thickness, which comprises:

a. passing a thermoplastic material through die extruding means;

b. selectively regulating the thickness of the thermoplastic material across its width and in a direction parallel to its edges, prior to exiting from the die extruding means, so as to impart to it a profile of varying thickness;

c. extruding said thermoplastic film which obtains a profile of varying thickness substantially as imparted to it by the die; and d. laminating said film to the moving substrate.

5. Process for laminating a moving substrate with a unitary thermoplastic film having predetermined zones of different film thickness, which comprises:

a. passing a thermoplastic material through die extruding means;

b. selectively regulating the pressure of the thermoplastic material in areas across its width and in a direction parallel to its edges, prior to exiting the die extruding means, so as to cause said thermoplastic material to take on, upon exiting said die extruding means, a profile of varying thickness across its width and extensive in a direction parallel to the edges of the film;

c. extruding said thermoplastic film through a uniform die exit having parallel edges, the film taking on, after passing said edges, a profile of varying thickness substantially as imparted to it by the die extruding means; and d. laminating the film, having a profile of varying thickness, to the moving substrate.

6. A method of forming paperboard cartons having a bottom structure comprising bottom folding panels foldable about a major horizontal score line, the method comprising the step of:

extruding a unitary profiled film of a thermoplastic polymer onto an elongated paperboard web, said film having a thick strip overlying the area in the paperboard web from which the bottom structure of the carton, including the bottom folding panels and the major horizontal score lines, is to be formed.

7. A method of forming paperboard cartons having a bottom structure comprising bottom folding panels foldable about a major horizontal score line, the method comprising the steps of:

extruding a unitary profiled film of a thermoplastic polymer onto an elongated paperboard web, said film having a thick strip covering an area in said web from which the major horizontal score lines will be formed, and a thinner strip covering other portions of said web, and rolling said web, with said film thereon, upon itself to form a roll.

8. Process for laminating a moving substrate with a unitary thermoplastic film having predetermined zones of different film thickness, which comprises:

passing a thermoplastic material between the die lips of a die extruding means, each of said lips comprising spaced opposed faces terminating at straight edges which are substantially parallel and in part define a uniform elongated orifice, said faces upstream of said edges varying at predetermined positions, in their distance apart from each other, so as to cause said material to take on a profile of varying thickness upon exiting said orifice, extruding said thermoplastic film which takes on, upon exiting the die, a profile of varying thickness substantially as imparted to it by the die; and laminating said film, having a profile of varying thickness, to the moving substrate.

9. In the method of forming a container from foldable rigid material, such as paperboard, the bottom structure of which is formed by folding bottom folding panels about a major horizontal bottom score line, the method comprising the steps of:

extruding a film of thermoplastic polymer having a lesser predetermined thickness in predetermined areas thereof and a greater predetermined thickness in other areas thereof, thereby forming relatively thick and thin strips in said film, and depositing said film onto a web of said material including placing said thick strip over an area of said web in which said bottom structure, including said bottom folding panels and said major horizontal bottom score lines, is to be formed.

10. The method of claim 9 wherein the step of extruding includes extruding a film wherein the thinner strip is approximately one-half the thickness of said thick strip.

11. In the method of forming paperboard cartons each of whose bottom structure is formed by folding bottom folding panels about a major horizontal bottom score line, the steps of, providing an elongated paperboard web wide enough to space at least two carton blanks across its width, said blanks to have their bottom ends in nesting relation, extruding a unitary film of thermoplastic polymer having a lesser predetermined thickness in predetermined areas thereof and a greater predetermined thickness in other areas thereof, thereby forming relatively thick and thin strips in said film, depositing said film onto a web of said material including placing said thick strip over an elongated web area from which the bottom structure of the cartons are to be cut and stored and placing thinner strips of said film over the web area from which portions of the walls of said at least two carton blanks are to be formed, and thereafter, scoring and cutting said web to form individual carton blanks, said scoring including forming the major horizontal bottom score lines within the elongated area of the web covered by said thick strip of film.

12. The method of claim 11 wherein the step of extruding includes extruding a film wherein a thinner strip of said film is approximately one-half the thickness of a thick strip.

13. In the method of forming paperboard cartons each of whose bottom structure is formed by folding bottom panels about a major horizontal bottom score line, the steps of:

providing an elongated paperboard web wide enough to space at least two carbon blanks across its width, said blanks to have their bottom ends in nesting relation, extruding a unitary film of thermoplastic polymer onto said entire paperboard web, said film having a strip thicker than other portions thereof and approximately six inches wide overlying the area from which the bottom structure of the cartons, including the bottom panels and the major horizontal score lines of the cartons, are to be cut and scored, respectively, winding said web, having said film thereon, on a reel, and thereafter, scoring and cutting said web to form individual carton blanks, said scoring including forming said major horizontal bottom score lines within the area of the web covered by said thicker strip of film.

14. The method according to claim 12 in which said thick strip is approximately twice the thickness of other portions of said film.

15. A method of extruding a thermoplastic film having predetermined zones of significantly different film thicknesses, comprising the steps of:
   passing a thermoplastic material through die extruding means;
   selectively regulating the pressure of the thermoplastic material within the die extruding means, and prior to exit therefrom, so as to cause said thermoplastic material to take on, upon exiting said die extruding means, a profile of varying thickness across its width; and
   extruding said thermoplastic material through a uniform rectangular die exit having substantially parallel edges throughout, the thermoplastic material taking on and maintaining, after passing said edges, a profile of significantly varying thickness.

16. A method as in claim 15 wherein said thermoplastic material is extruded such that its thickest zones are about twice as thick as its thinnest zones.

17. Process for laminating a moving substrate with a unitary thermoplastic film having predetermined zones of different film thickness, which comprises:
   a. passing a thermoplastic material through die extruding means;
   b. selectively regulating the pressure of the thermoplastic material across its width and in a direction parallel to its edges prior to exiting the die extruding means, so as to cause said thermoplastic material to take on, upon exiting said die extruding means, a profile of varying thickness across its width;
   c. extruding said thermoplastic film which takes on, upon exiting the die extruding means, a profile of varying thickness substantially as imparted to it by the die extruding means; and
   d. laminating said film, having a profile of varying thickness, to the moving substrate.

18. The process as recited in claim 17 in which said thermoplastic material is polyethylene.

19. The process as claimed in claim 17 in which said substrate is paperboard.

20. The process as recited in claim 17 in which said thermoplastic material is selected from a group of polymeric materials consisting of polyethylene, polypropylene, nylon and vinyl.

21. A method of forming a laminated composite from which containers can be made, said composite including an elongated paperboard substrate of indeterminate length and a unitary thermoplastic film coating thereon, said unitary film having predetermined longitudinally extending zones of different film thicknesses, the method comprising:
   laminating the film to the elongated substrate so that the film's thickest zones cover areas of the substrate in which bottom structures of said containers, including bottom folding panels and a major horizontal bottom score line, are to be formed.

22. A method as in claim 21 including the step of rolling said composite upon itself to form a roll.

23. A method as in claim 22 including the steps, after said rolling, of unwinding said composite and thereafter cutting and scoring said composite to form carton blanks.

24. A method of making an article adapted for the manufacture of carton blanks from which paperboard cartons can be formed, said cartons having a bottom structure formed by folding panels on a major horizontal bottom score line and the article comprising, an elongated unimpregnated and unscored paperboard web of indeterminate length having a predetermined width which is sufficient to accommodate a plurality of longitudinally extending adjacent rows of unformed carton blanks thereacross, at least one longitudinally extending area in said web including portions of unformed blanks in two of said adjacent rows, and within which area the major horizontal score lines and folding panels for each of the blanks in said two rows are to be formed, and a unitary profiled thermoplastic film covering a surface of said web, said film having a plurality of longitudinally extending strips of varying thickness, a strip of greater thickness covering said longitudinally extending area of said web such that said strip of greater thickness is of a width to cover the to be formed major horizontal score lines and folding panels of said blanks in said two rows, and at least one strip of lesser thickness covering the remainder of said web, the method comprising the steps of extruding a unitary thermoplastic material and thereafter laminating said unitary profiled thermoplastic film, formed from said extruded material, to said web such that said strip of greater thickness covers said longitudinally extending area.

25. The method of claim 24 including the further step of rolling said web and laminated film upon itself to form a roll.

26. A method as in claim 24 wherein said web includes at least two longitudinally extending areas, each of said areas respectively including portions of unformed blanks in a respective set of two of said adjacent rows, and within which the major horizontal score lines and folding panels for each of the blanks in each of said respective set of two rows are to be formed, and a unitary thermoplastic film covering a surface of said web, said film having a plurality of longitudinally extending strips of varying thickness, strips of relatively greater thickness covering said longitudinally extending areas of said web such that said each strip of greater thickness is of a width to respectively cover the to be formed major horizontal score lines and folding panels of said blanks in a respective set of two rows, and at least one strip of lesser thickness covering the remainder of said web, and wherein the method comprises the steps of extruding a thermoplastic material and thereafter laminating said unitary thermoplastic film, formed from said extruded material, to said web such that said thick strips of relatively great thickness cover respective ones of said longitudinally extending areas.

27. The method of claim 26 including the extruding step of extruding such that said greater thickness is about twice as thick as said lesser thickness.

28. A method for laminating an elongated, moving paperboard substrate with a unitary thermoplastic film having predetermined zones of different film thickness to provide an article from which liquid containers, such as milk cartons can be made, said containers each having a bottom structure including bottom folding panels foldable about a major horizontal score line and said substrate having at least one longitudinally extending area in which the major horizontal score lines and bottom panels are to be formed, the method comprising the steps of:

passing a thermoplastic material through die extruding means;

selectively regulating the pressure of the thermoplastic material within the die extruding means, and prior to exit therefrom, so as to cause said thermoplastic material to take on, upon exiting said die extruding means, a profile of varying thickness across its width;

extruding said thermoplastic material through a uniform die exit having respectively parallel edges throughout, the thermoplastic material taking on, after passing said edges, a profile of varying thickness substantially as imparted to it by the die; and laminating said extruded thermoplastic material as a film to the moving substrate, said film substantially maintaining the taken on profile of varying thickness, said laminating including laminating a thicker portion of said film onto said longitudinally extending area and thinner portions of said film to other areas of said substrate.

29. A method as in claim 28 wherein said lamination step includes laminating said film to a moving unscored paperboard substrate.

30. A method as in claim 28 wherein said thermoplastic material is polyethylene.

31. A method as in claim 28 wherein the substrate has at least two separate longitudinally extending areas in which major horizontal score lines and bottom panels are to be formed and wherein said material is regulated to cause the film, upon exit from the die extruding means, to take on a profile of varying thickness having at least two portions of thicker thickness than other portions of said film, and including laminating said two thicker portions respectively to a respective longitudinally extending area.

32. A method as in claim 28 including the step of rolling said substrate, with said film having predetermined zones of different film thickness thereon, into a generally cylindrical roll.

33. A method as in claim 28 wherein said lamination step includes laminating said film to an umimpregnated paperboard substrate.

* * * * *

UNITED STATES PATENT AND TRADEMARK OFFICE
CERTIFICATE OF CORRECTION

PATENT NO. : 3,976,527
DATED : August 24, 1976
INVENTOR(S) : Kenneth Thompson et al It is certified that error appears in the above-identified patent and that said Letters Patent are hereby corrected as shown below:

Column 1, line 59, "as" should be --an--.

Column 2, line 37, "coating" should be --exiting--.

Column 4, line 21, "web" should be --such--.

Column 10, line 38, Claim 11, "stored" should be --scored--.

Column 10, line 56, Clain 13, "carbon" should be --carton--.

Column 11, line 6, Claim 14, "claim 12" should be --claim 13--.

Column 11, line 49, Claim 19, "claimed" should be --recited--.

Column 13, line 14, Claim 28, "respectively" should be --respective--.

Signed and Sealed this

Seventh Day of June 1977

[SEAL]

Attest:

RUTH C. MASON
*Attesting Officer*

C. MARSHALL DANN
*Commissioner of Patents and Trademarks*